Patented Jan. 2, 1923.

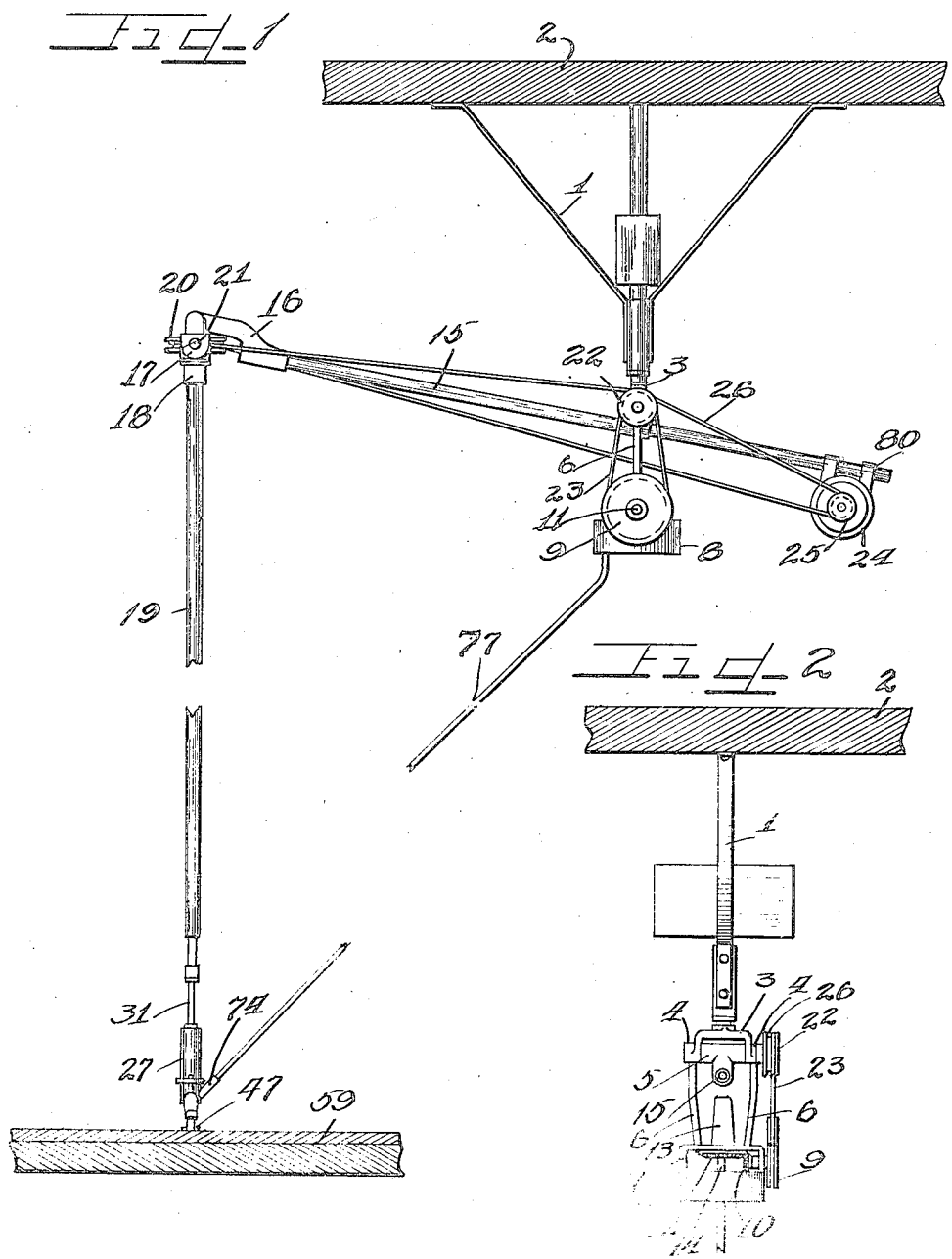

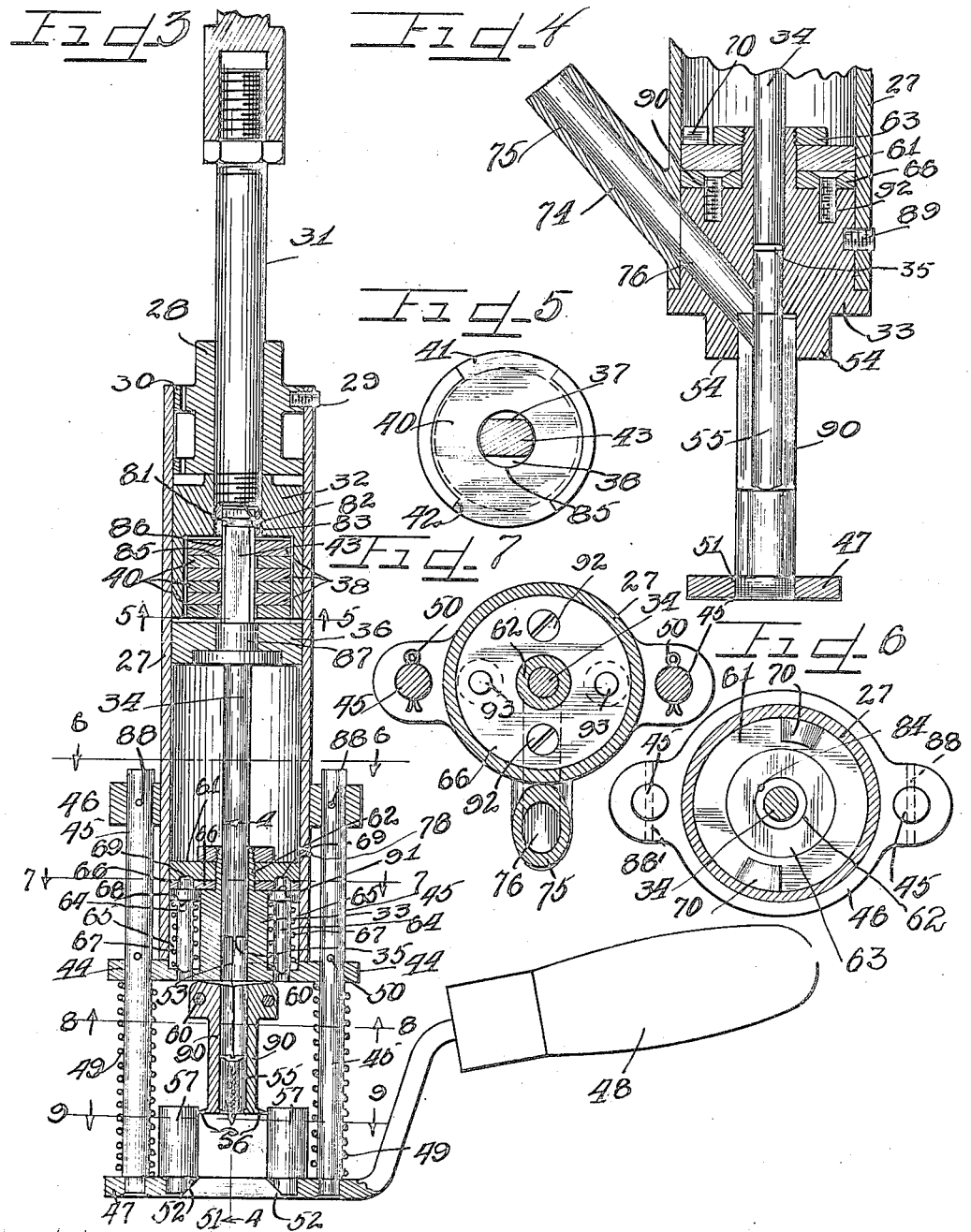

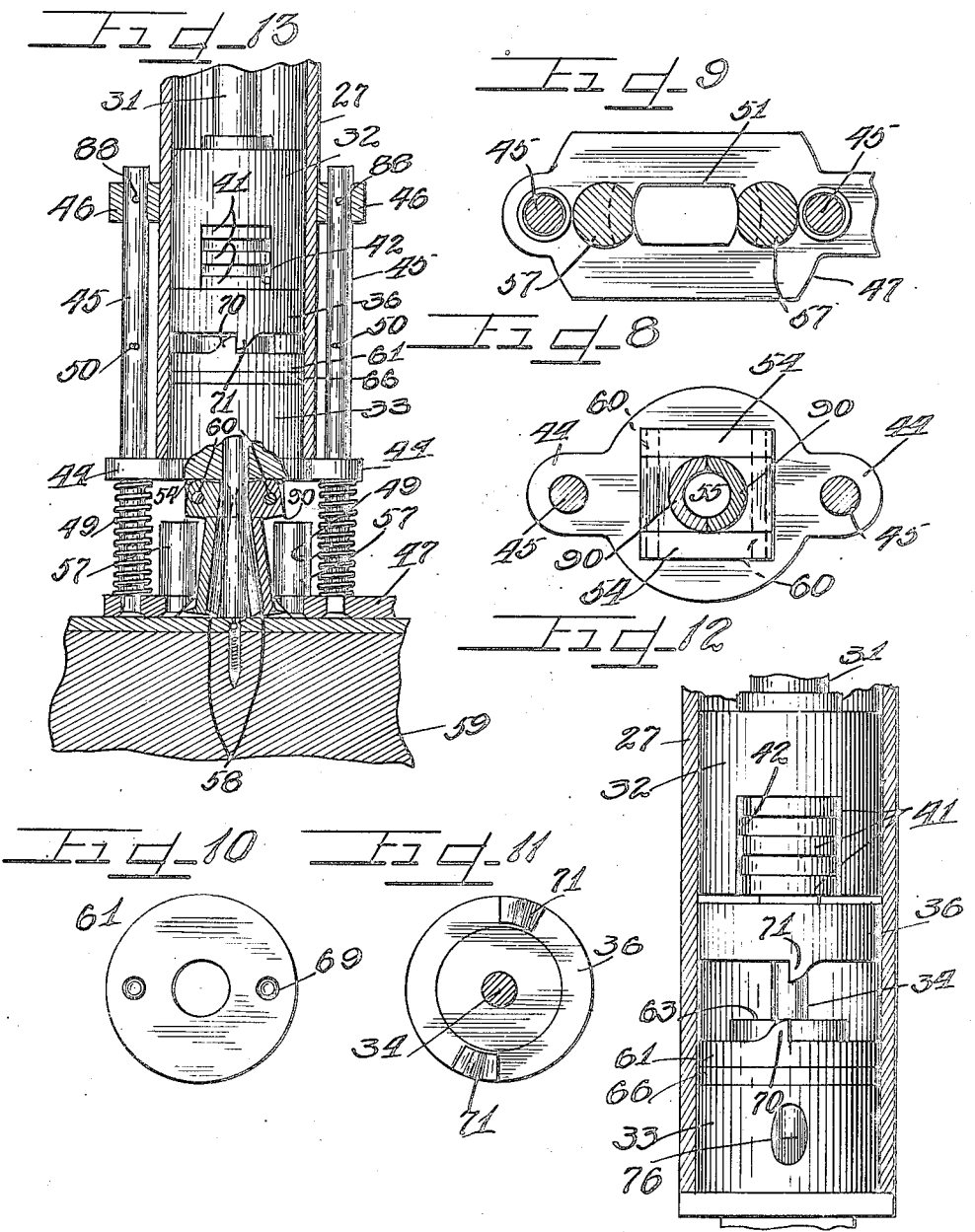

1,441,033

UNITED STATES PATENT OFFICE.

SIMON E. SCHROEDER, OF MINIER, ILLINOIS.

AUTOMATIC SCREW DRIVER.

Application filed January 3, 1919. Serial No. 269,509.

*To all whom it may concern:*

Be it known that I, SIMON E. SCHROEDER, a citizen of the United States, and a resident of the city of Minier, in the county of Tazewell and State of Illinois, have invented certain new and useful Improvements in an Automatic Screw Driver; and I do hereby declare that the following is a full, clear, and exact description of the same, reference being had to the accompanying drawings, and to the numerals of reference marked thereon, which form a part of this specification.

My invention has reference more particularly to a device, which may be power driven, and is adapted to receive and drive a screw and discontinue the driving operation when the screw is properly engaged in the work.

It is an object of my invention to provide a portable power driven automatic screw driving machine which is adapted to receive and drive a screw, and automatically discontinue the driving of a screw when it is properly seated in the work.

Another object of my invention is to provide a power driven screw driving machine which is adapted to receive and hold a screw in proper driving position, and automatically release the same when it is sufficiently engaged in the work to require no further holding.

Another object of my invention is to provide an automatic screw driving mechanism with a clutch which is automatically released to discontinue driving the screw when the screw is properly engaged in the work.

A further object of my invention is to provide a screw driving device having a clutch and clutch releasing mechanism to interrupt driving of the screw when it is firmly seated in the work and with the head in a predetermined position of rotation.

Another object of my invention is to provide an automatic screw driving mechanism which is suitably mounted and counterbalanced to swing readily to various positions.

My invention also has other important objects which will appear from the following specification and the accompanying drawings, in which I have illustrated and described my invention in a preferred form.

On the drawings:

Figure 1 is a side elevation of the complete machine, with parts broken away.

Figure 2 is a front view of the upper portion of the device showing the manner of supporting same.

Figure 3 is an enlarged vertical sectional view of the mechanism for holding and driving the screw.

Figure 4 is a fragmentary sectional view of the lower portion of the screw driving mechanism, taken on the line 4—4 of Figure 3.

Figure 5 is a bottom view of the clutch mechanism taken on the line 5—5 of Figure 3.

Figure 6 is a transverse sectional view on the line 6—6 of Figure 3.

Figure 7 is a similar view on the line 7—7 of Figure 3.

Figure 8 is a sectional view on the line 8—8 of Figure 3.

Figure 9 is a sectional view on the line 9—9 of Figure 3.

Figure 10 is a bottom view of the plate or disk with which the stopping plungers engage.

Figure 11 is a bottom view of the clutch engaging ring with the screw driven stem in section.

Figure 12 is a fragmentary view of the screw driving mechanism with the casing in section and the mechanism therein in elevation and shows the screw driver partially depressed.

Figure 13 is a similar view with the addition of the screw holding devices, and shows the screw driving mechanism entirely depressed.

As shown on the drawings:

The reference numeral 1, indicates a supporting frame for the device, which may be of any suitable form, and is secured to a ceiling or any convenient means 2, which will hold the device at the desired elevation. Vertically pivoted to the lower end of the frame 1, is a bracket 3, having a pair of opposed bearings 4, in which a knuckle 5, is horizontally pivoted. Depending from each bearing 4, is an arm 6, supporting a yoke 7, at the lower ends. A screw magazine 8, is carried by this yoke 7, and contains screw feeding mechanism of any suitable type, which is driven by a pulley 9, secured on a shaft 11, which is journalled in one arm of the yoke 7. The shaft 11 has a bevel pinion 10, on the inner end thereof in mesh with a bevel gear 12, secured on a shaft 14. The shaft 14 is journalled in a hub 13, on the

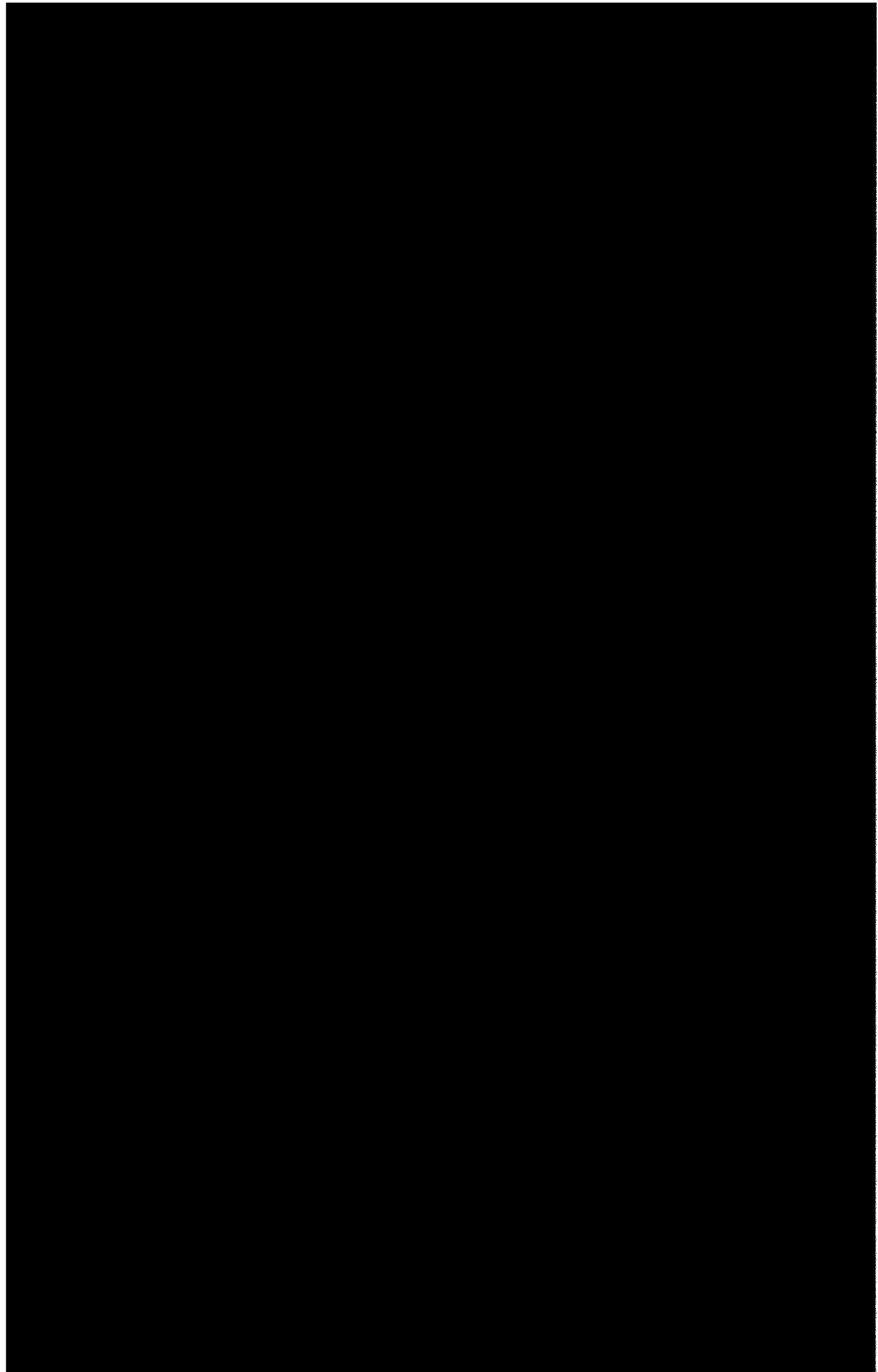

ward movement being limited by the pins 50, which are passed through the stems 45, above the lugs 44.

The plate 47 has an elongated aperture 51, directly below the stem 34, the end walls of which said aperture are beveled outwardly and downwardly as at 52. Depending from the lower face of the plug 33, and at opposite sides of the aperture 53, therethrough, are lugs 54, between which are pivotally mounted a pair of screw holding members 90. These screw holding members 90, are internally grooved to afford, when closed together, a tube or opening 55 therethrough, of substantially the same diameter as the head of the screw to be used, and at the lower end of each, there is an outwardly extending flange 56, which normally engages with studs 57, one at each end of the aperture 51, to hold the members 90 closed together. At the lower end of each member 54, and at the inside thereof, is also an inwardly extending tapered lip 58, and these are separated sufficiently, when the members 54 are closed together, to permit the screw to drop down therebetween, as shown in Figure 3, and hold the screw supported by engagement of the lips 58, under the head of the screw.

When the screw driver mechanism is being used, the plate 47 is rested upon the work indicated herein at 59, and the flexible shaft 19, is pressed downwardly. The barrel 27, being resiliently supported by means of the springs 49, is held in the elevated position while the clutch casing 32 and the stem 34 are depressed, until the latter engages the head of the screw, whereupon, by reason of the engagment of the head of the screw with the inturned lips 58 at the bottom of the holders 90, the casing 27 and parts connected therewith are forced downwardly against the tension of the springs 49. Continuing pressure on the flexible shaft, the threading of the screw into the work permits the casing 27 and the ports therein to descend in response to the pressure on the shaft 19. As the screw becomes imbedded in the work the outturned flanges 56, on the holders 90, pass beyond the lower end of the studs 57, into engagement with the inclined end faces 52 of the slot 51 and the head of the screw acting against the lips 58 moves the lower ends of the members 90 apart so that the head of the screw may be sunk into the face of the work.

In order to release the clutch when the screw is entirely seated and also to finish the operation with the slot in the head of the screw in a predetermined position of rotation, determined by the position in which the handle 48, is held, I have provided the following construction. A disk 61, is mounted at the upper end of the plug 33, on a tubular extension 62, thereof, the upper end of which is threaded and provided with a nut 63 thereon, to hold the disk 61 in place and permit rotation thereof. A locking pin 84 may be engaged between the nut 63 and tubular extension 62, as shown in Figure 6, to prevent loosening of the nut on the stem. Plungers 64 are slidably mounted in vertical chambers 65, in the plug 33, and have shoulders 91 adjacent their upper ends to engage against a plate 66, which is interposed between the disk 61 and the plug 33, to limit the upward movement of the plungers, said plate being secured to the plug 33 by means of screws 92 and provided with perforations 93 through which the ends of the plungers 64, beyond the shoulders 68, project. A spring 67 is coiled around each stem and compressed between the shoulders 68, and the bottom wall of the chamber 65, to impel the plungers upwardly.

The upper end of each plunger 64, projects through the plate 66, and is rounded to engage in a recess 69 provided therefor in the under face of the disk 61, and the number of plungers and recesses 69, is such that the plungers engage the recesses 69 at each half revolution of the disk 61.

The upper face of the disk 61, has a pair of up-standing lugs 70, and the clutch plate 36, has downwardly extending projections or lugs 71, adapted to be engaged with the lugs 70, when the plate 36 is sufficiently depressed, said lugs 70 and 71 being provided with flat faces, which come into engagement. The distance of travel of the clutch and plate 36 in the casing 27, is such that the lugs 70 and 71 do not engage until the screw holding members 90, begin to separate at the termination of their downward movement, and when so engaged, the disk 61 disengages from the plungers 64 and rotates, and at each half revolution, the plungers 64 are engaged and disengaged therewith, so as to offer a temporary resistance to the operation of the disk 61. When the screw is entirely seated in the work, the engagement of the head with the work offers a greater resistance to the turning of the screw, which, however, is insufficient to prevent turning thereof, until the plungers 64, become engaged with the notches in the disk 61, whereupon the increased resistance of the screw combined with the resistance offered by the engagement of the plungers 64, with the disk 61, prevent further operation of the screw and result in a slipping of the disk clutch members 38 and 40.

The engagement of the lugs 70 and 71, and of the plungers 64 with the disk 61, is arranged to take place when the slot of the screw is in a certain position with reference to the handle 48, so that when the clutch is slipped and turning of the screw discontinued, the slot of the screw will occupy a predetermined position with reference to the handle 48, and it is therefore possible to

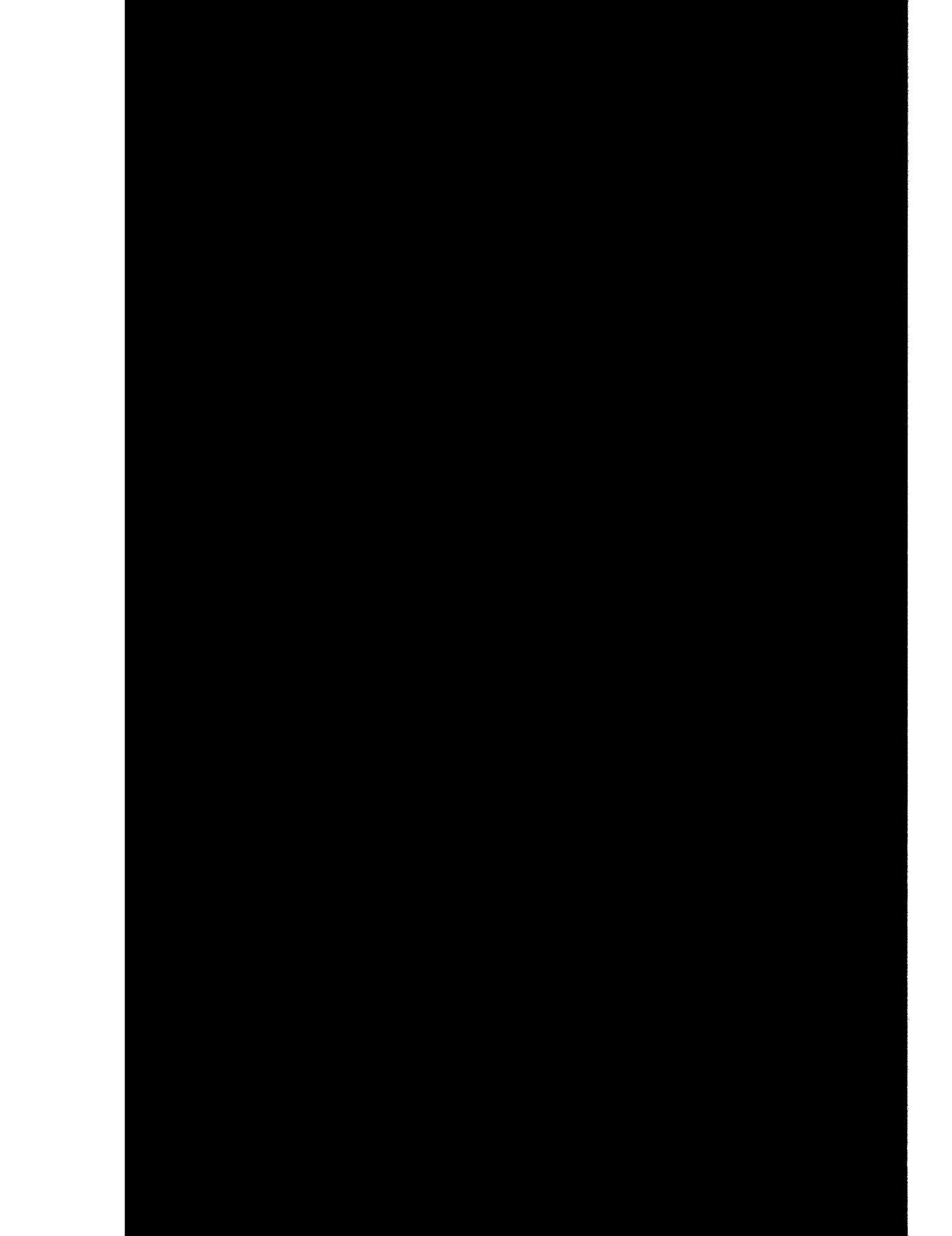

the shafts are moved towards said article to drive a screw therein, and guide members on the base adapted to prevent separation of the members until the head of the screw is adjacent the surface of said article.

2. In a device of the class described, a base adapted to rest upon the article into which a screw is to be driven, two shafts, holding means rigid with the base for supporting and guiding said shafts, a screw driver on one shaft, means for rotating the other shaft, a friction clutch between the shafts, and means for preventing relative axial movement of the shafts substantially greater than necessary for control of the clutch, the said holding means permitting rotation of said shafts and reciprocation of them greater than the said relative axial movement.

3. In a device of the class described, a base adapted to rest upon the article into which a screw is to be driven, driving mechanism carried by the base, a pair of separable members adapted to engage a screw beneath its head moveable towards the said article as the screw is driven therein, and guide members on the base adapted to prevent separation of the members until the head of the screw is adjacent the surface of said article.

4. The combination of a base adapted to rest on the article into which a screw is to be driven, a reciprocal member mounted thereon, screw driving mechanism in the reciprocal member, a pair of separable members on the reciprocal member adapted to hold a screw in position to be engaged and driven by the screw driving mechanism, and means on the base adapted to hold the separable members in engagement with the screw and release the same from such engagement as the reciprocal member approaches the limit of its engagement.

5. In a device of the class described, a screw driving mechanism, including a rotating tool, and a clutch through which power is transmitted to drive said tool in combination with means for automatically preventing the transmission of power through said clutch, said means including elements capable of acting only at certain phases of the rotation of said tool, whereby said prevention occurs when the screw is driven to a predetermined position, not only as regards its axial movement but also as regards its rotative movement.

6. In a screw driving machine, a screw driving tool, a clutch for transmitting power to said tool, said clutch being capable of transmitting only a limited amount of torque, the limit of said torque being larger than the torque required to drive the screw to a predetermined depth, and mechanism for resisting the turning of the screw driving tool, including a member which turns with said tool, devices which do not so turn and means acting when said member and devices are in predetermined relative positions to cause cooperation between said member and said devices, whereby said resistance exists only in predetermined positions of the slot in the screw head, the limit of said torque being less than the sum of the torque required to drive the screw to said predetermined depth and the torque required to overcome said resistance.

7. In a device of the class described, the combination of screw driving mechanism, a clutch through which power is transmitted for the operation of the screw driving mechanism, yieldable resisting means for opposing the operation of the screw driving mechanism after a predetermined operation thereof, and acting when the screw is seated in the work to prevent the transmission of power through the clutch and discontinue the operation of the screw driving mechanism.

8. In a device of the kind described, a base adapted to rest upon the article into which a screw is to be driven, a screw driver rotatably and reciprocably carried by the base, and means movable with the screw driver for holding a screw in engagement with the screw driver whilst the screw is being driven until the head of the screw is adjacent the surface of the article.

9. In a device of the kind described, a base adapted to rest upon the article into which a screw is to be driven, screw driving mechanism carried by the base, a pair of separable members having projections adapted to engage a screw beneath its head movable towards said article as the screw is driven therein, and guide members on the base adapted to prevent separation of the members until the head of the screw is adjacent the surface of said article, said projections having inclined engaging faces whereby the head of the screw forces the separable members apart when permitted to do so by the guide members.

10. In a device of the class described, the combination of screw driving mechanism, a clutch through which power is transmitted for the operation of the screw driving mechanism, a disc adapted to be engaged and rotated by the screw driving mechanism when the screw is seated in the work, and yieldable resisting means for opposing the rotation of said disc and thereby discontinuing the operation of the screw driving mechanism.

11. In a device of the class described, the combination of screw driving mechanism, a clutch through which power is transmitted for the operation of the screw driving mechanism, a disc adapted to be engaged and rotated by the screw driving mechanism when the screw is seated in the work, and yieldable resisting means opposing the rotation of said disc at intervals not less